United States Patent [19]

Eichelberger et al.

[11] 4,430,557
[45] Feb. 7, 1984

[54] COOKING APPARATUS HAVING INTERNAL PRESSURIZING SOURCE AND INTEGRAL HEAT SOURCE

[75] Inventors: Charles W. Eichelberger, Schenectady; Robert J. Wojnarowski, Ballston Lake, both of N.Y.

[73] Assignee: General Electric Company, Schenectady, N.Y.

[21] Appl. No.: 336,805

[22] Filed: Jan. 4, 1982

[51] Int. Cl.³ .................. F27D 11/02; A21B 1/00
[52] U.S. Cl. ...................... 219/401; 99/417; 126/369; 219/398; 219/431; 219/440; 219/411
[58] Field of Search ............ 219/386, 362, 396, 397, 219/398, 399, 400, 401, 408, 411, 412, 431, 432, 430, 440; 126/281, 369; 99/339, 417, 467; 426/243, 506

[56] References Cited

U.S. PATENT DOCUMENTS

| | | | |
|---|---|---|---|
| 2,305,056 | 12/1942 | Austin | 219/401 |
| 2,499,525 | 3/1950 | Person | 219/362 |
| 2,719,211 | 9/1955 | Lewis et al. | 219/401 X |
| 2,862,095 | 11/1958 | Scofield | 219/400 X |
| 2,899,534 | 8/1959 | Sjolund | 219/440 |
| 3,030,486 | 4/1962 | Lashley | 219/401 X |
| 3,331,943 | 7/1967 | Ett | 219/401 X |
| 3,424,231 | 1/1969 | Truhan | 219/401 X |
| 3,428,783 | 2/1969 | Niles | 219/401 X |
| 3,456,598 | 7/1969 | MacKay | 219/401 X |
| 3,495,071 | 2/1970 | Niles | 219/401 |
| 3,604,895 | 9/1971 | MacKay | 219/401 |
| 4,010,349 | 1/1977 | Lea | 219/401 |
| 4,039,776 | 8/1977 | Roderick | 219/401 |
| 4,147,924 | 4/1979 | De Witt, Jr. | 219/417 |
| 4,173,215 | 11/1979 | Bureau et al. | 126/369 |

FOREIGN PATENT DOCUMENTS

| | | | |
|---|---|---|---|
| 91988 | 10/1961 | Denmark | 219/401 |
| 317309 | 4/1930 | United Kingdom | |
| 605265 | 7/1948 | United Kingdom | 219/401 |
| 754510 | 8/1956 | United Kingdom | |
| 820715 | 9/1959 | United Kingdom | |
| 1383560 | 2/1975 | United Kingdom | |
| 1449645 | 9/1976 | United Kingdom | |
| 1584222 | 2/1981 | United Kingdom | |

Primary Examiner—Volodymyr Y. Mayewsky
Attorney, Agent, or Firm—Geoffrey H. Krauss; James C. Davis, Jr.; Marvin Snyder

[57] ABSTRACT

A self-standing cooking apparatus is disclosed which consists of a pressurizable vessel having a door which can be latched and sealed, an integral steam-pressure source and integral upper and lower heating rod elements which serve as broil elements and bake elements, respectively, and a water-filled tray which can be disposed above the upper heating rod. An electrical control circuit enables selective energization of the bake and broil heat elements by continuous or controlled duration pulses of current which control the proportion of infrared energy that will be produced by the heating rods. The oven can be operated under pressure with the heating rods applying infrared radiation to the foodstuff being cooked in order to obtain browning or crisping of the foodstuff which is cooked at elevated pressure. The oven can also be operated in a conventional bake mode, a conventional broil mode, a steam cooking mode, a sealed cooking and warming mode and a toasting mode. Reinforcing fins lying in parallel planes are secured to and encircle the exterior of the container to provide necessary additional strength for the pressurizable vessel walls to withstand a maximum design pressure.

31 Claims, 26 Drawing Figures

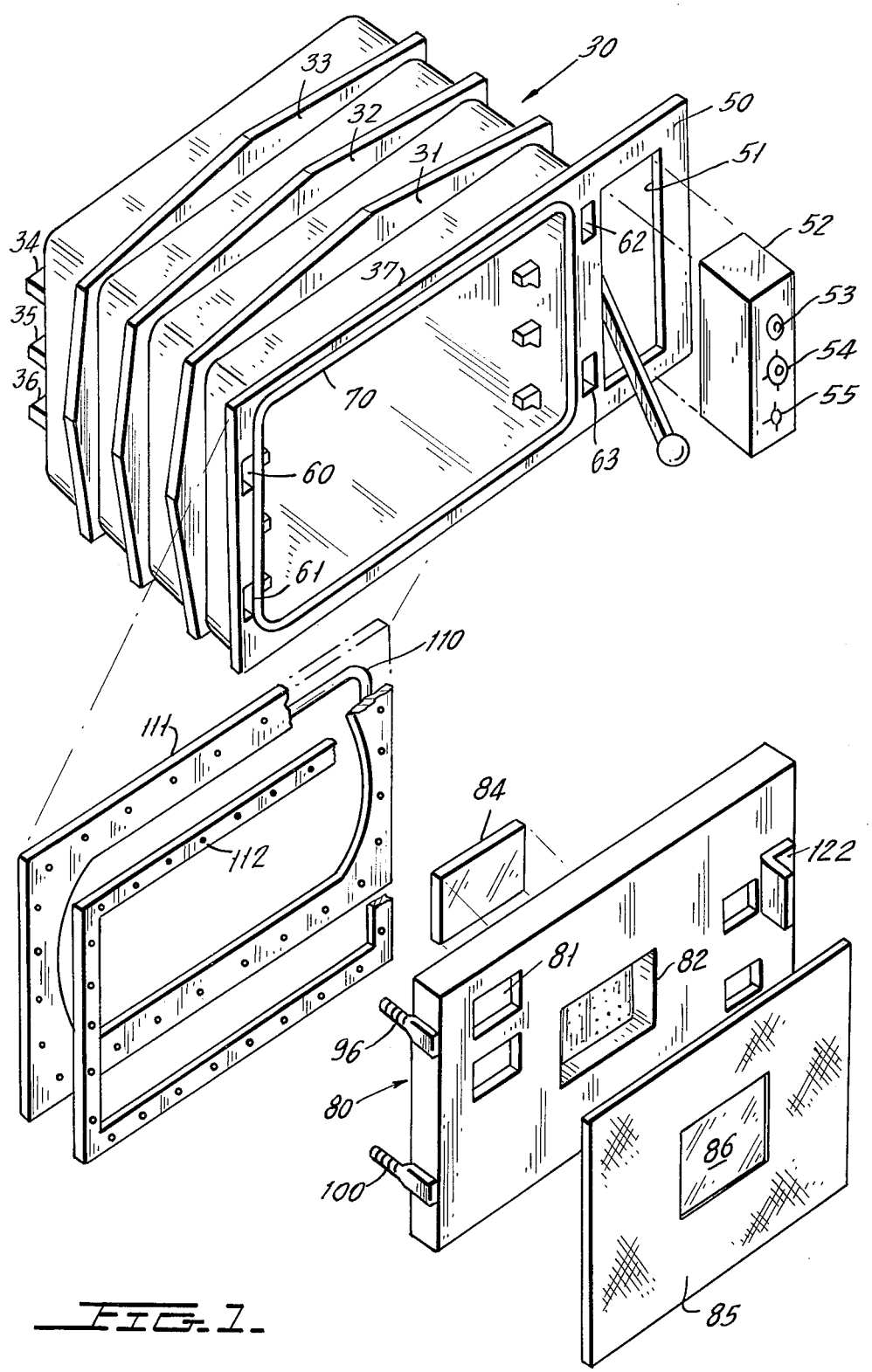

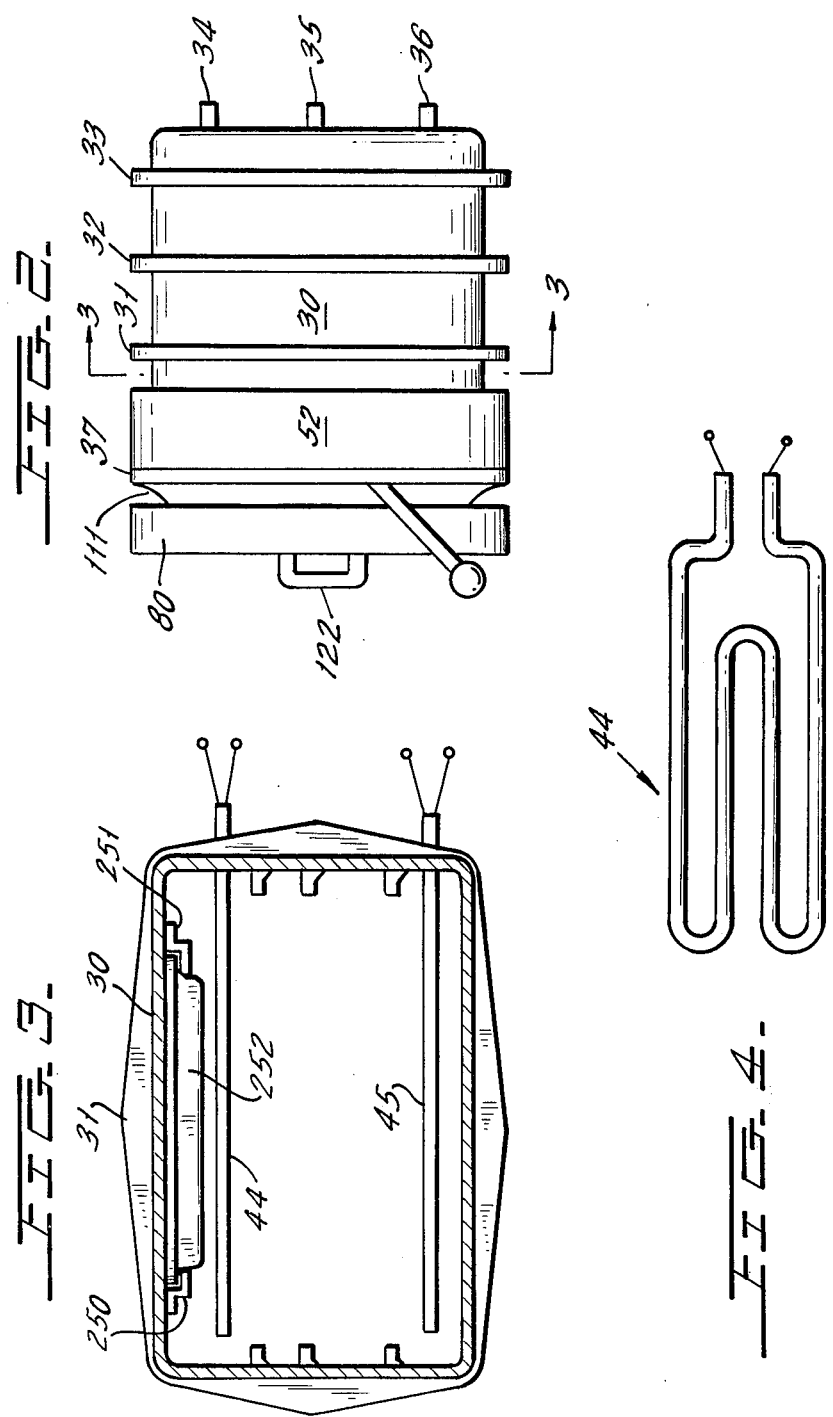

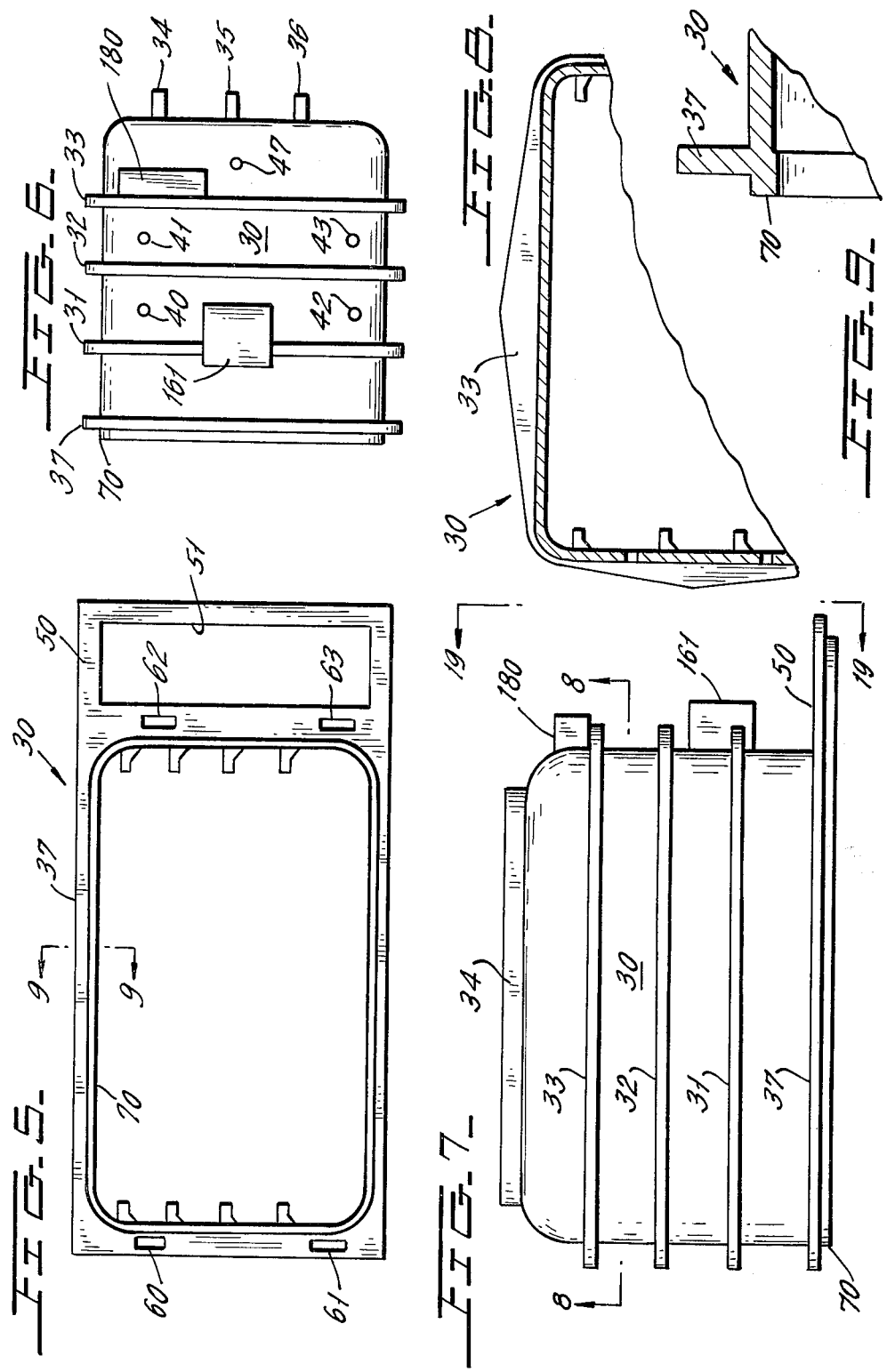

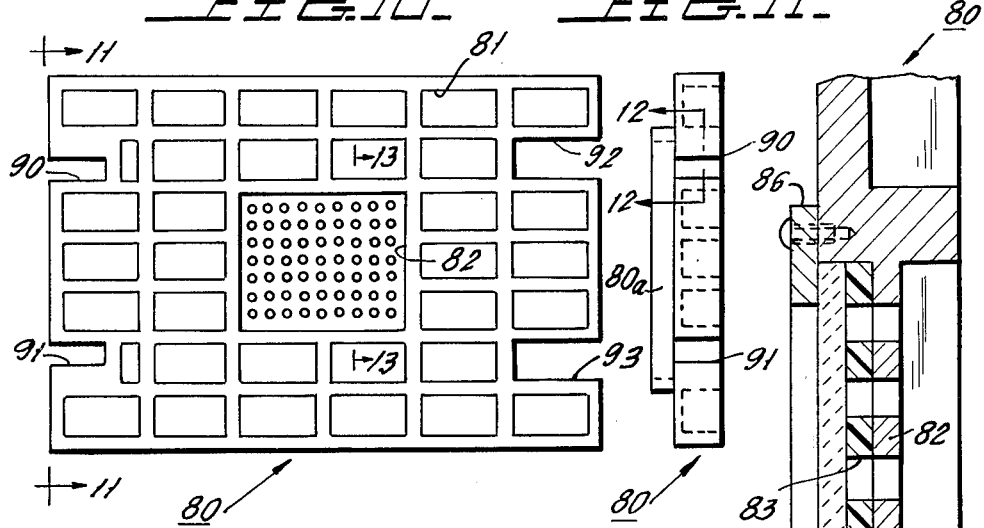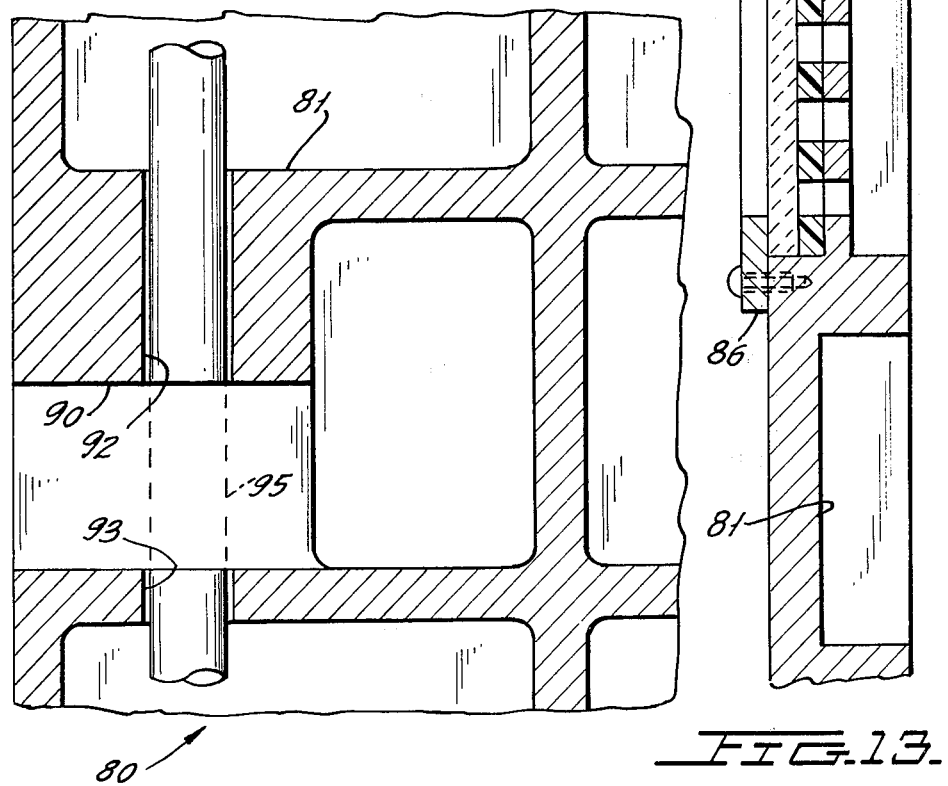

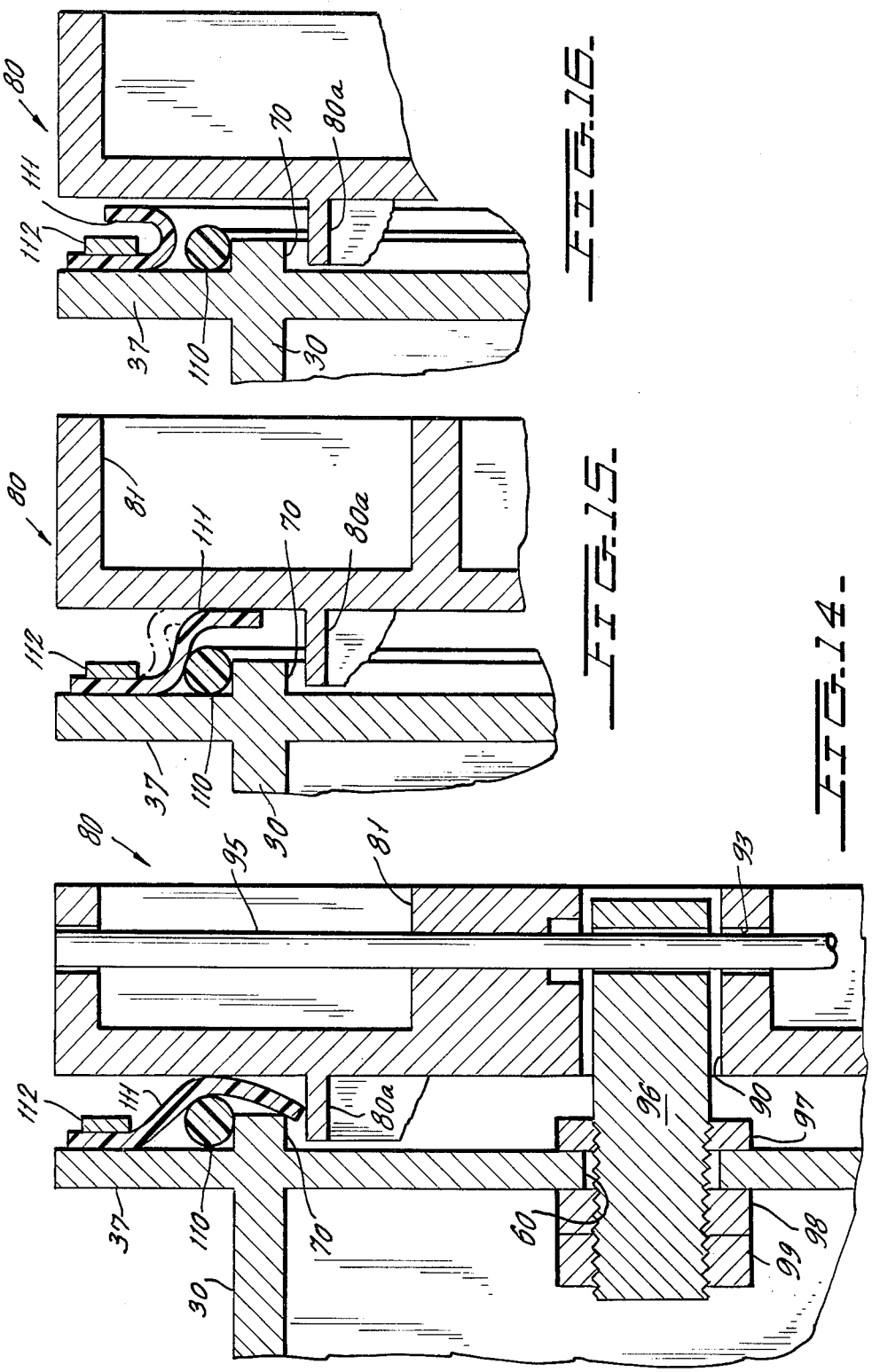

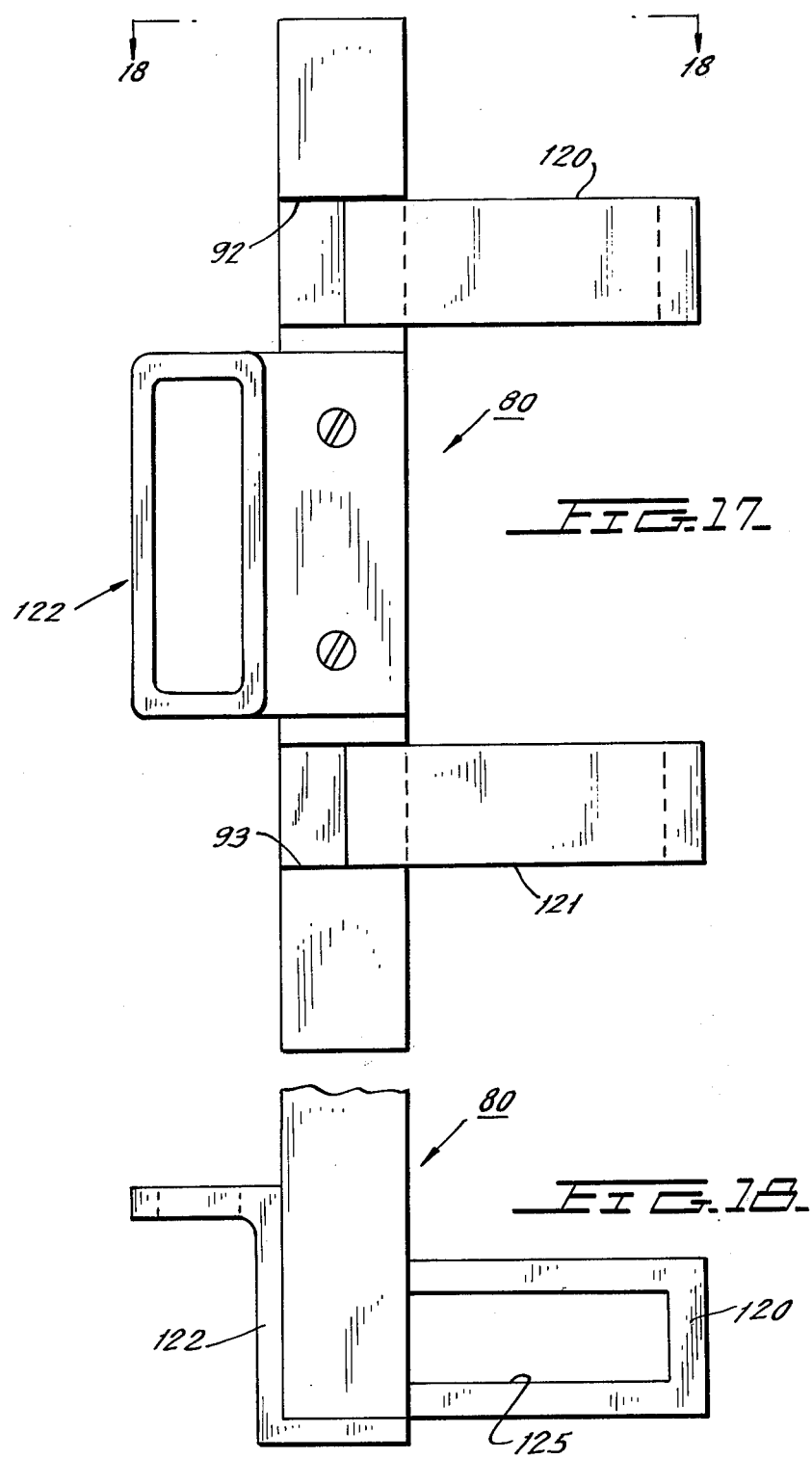

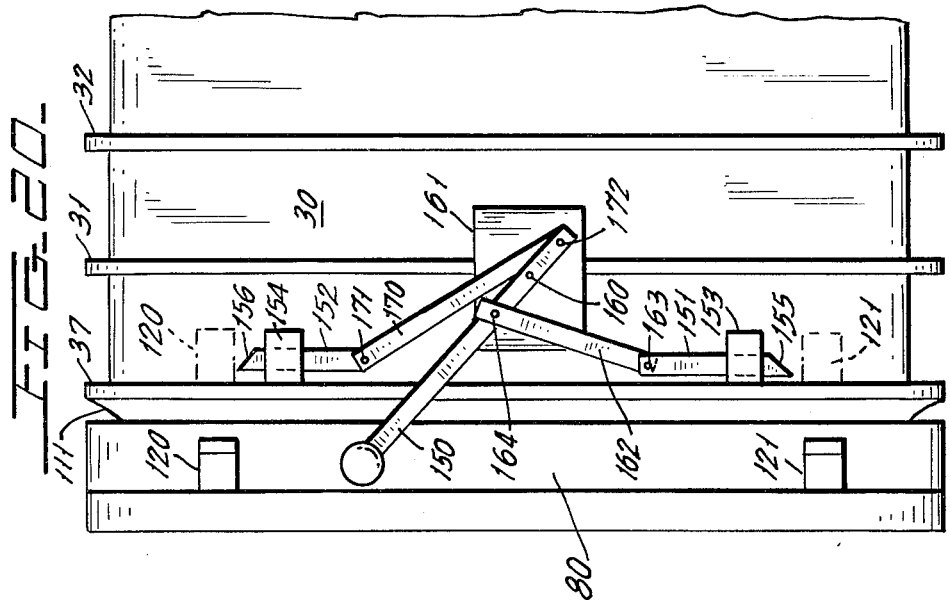
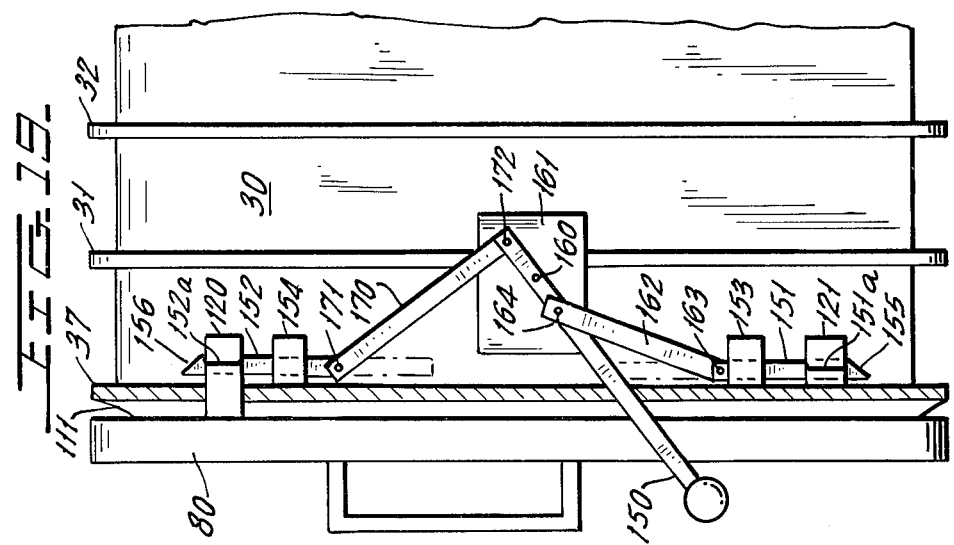

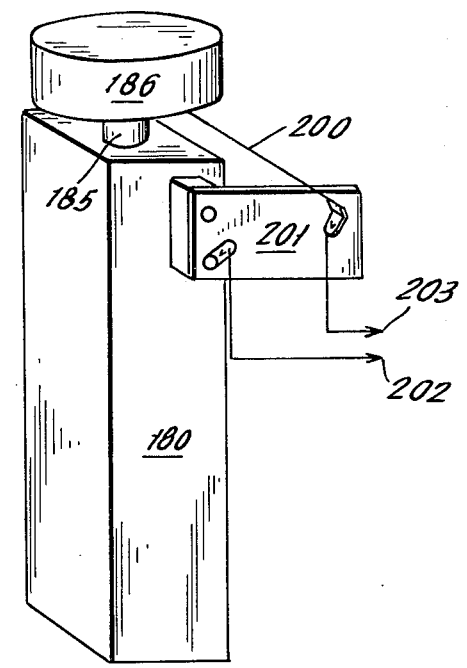
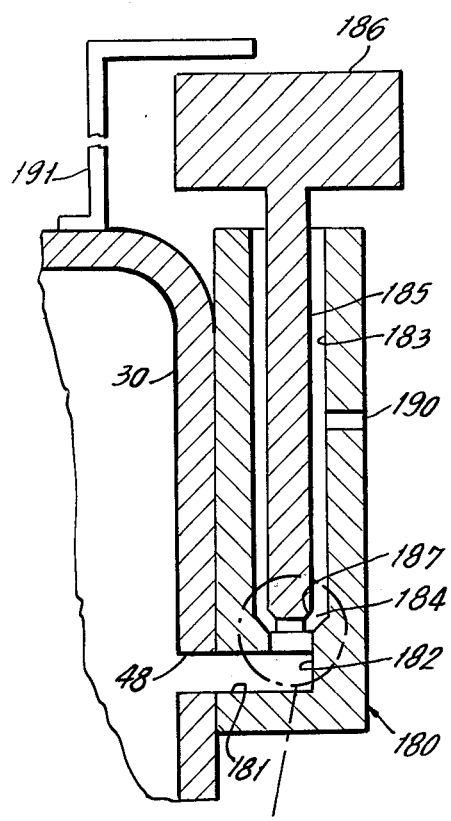
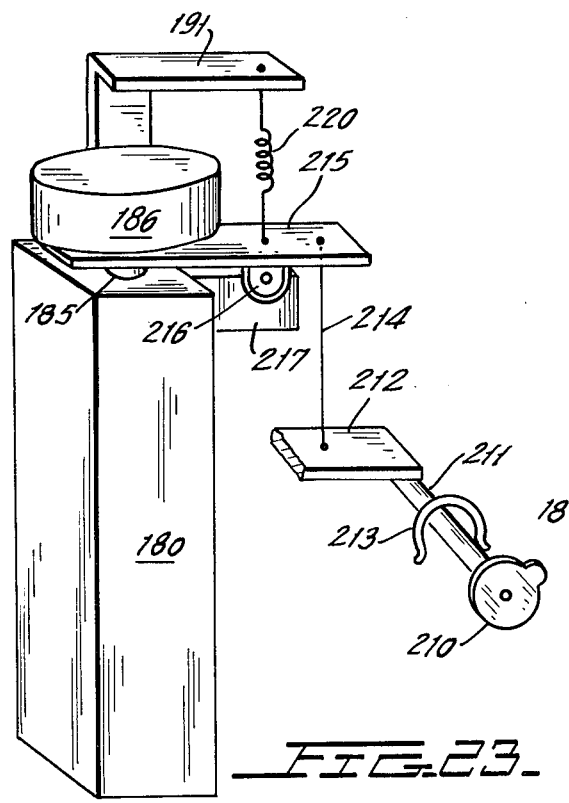

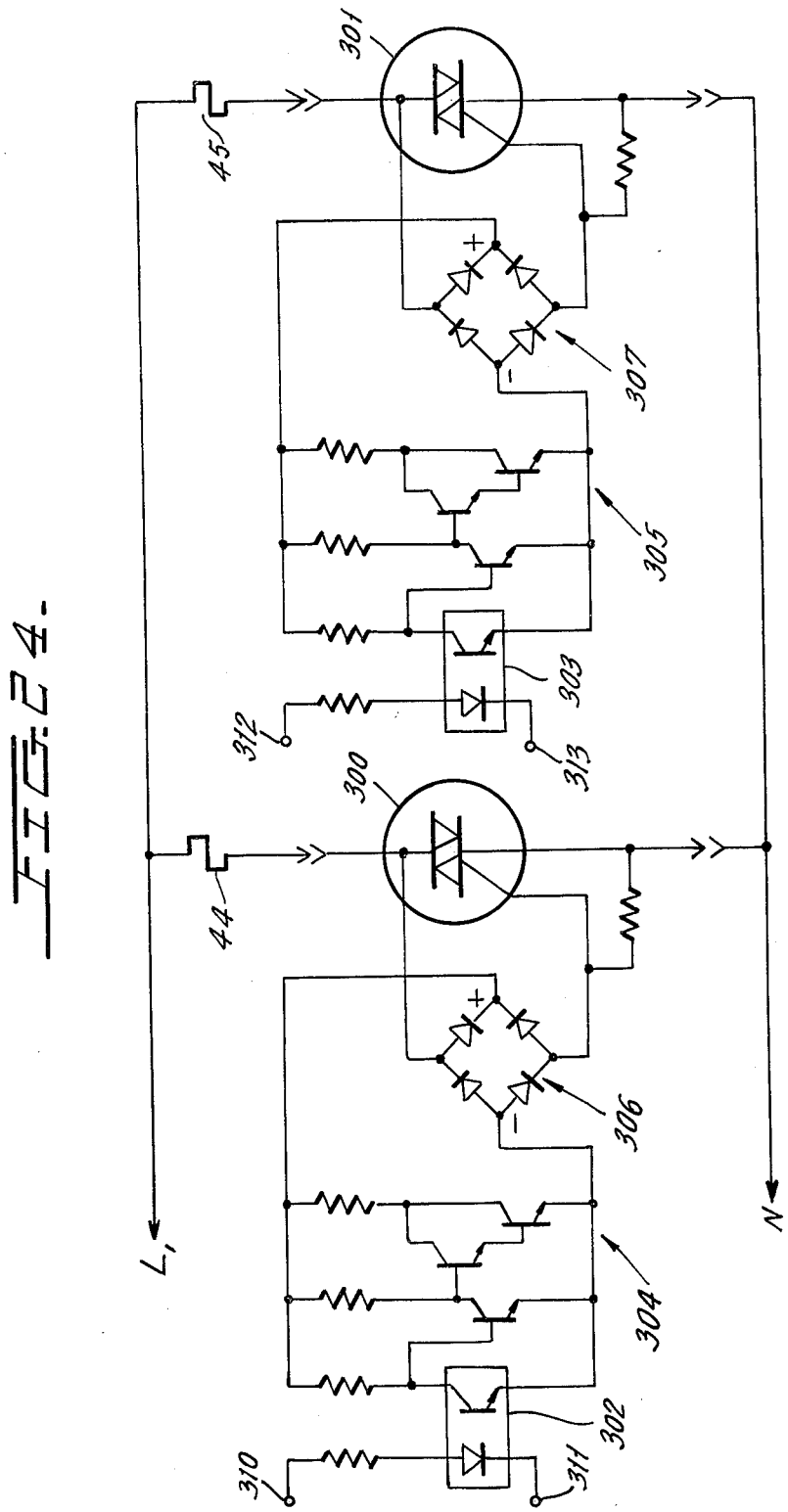

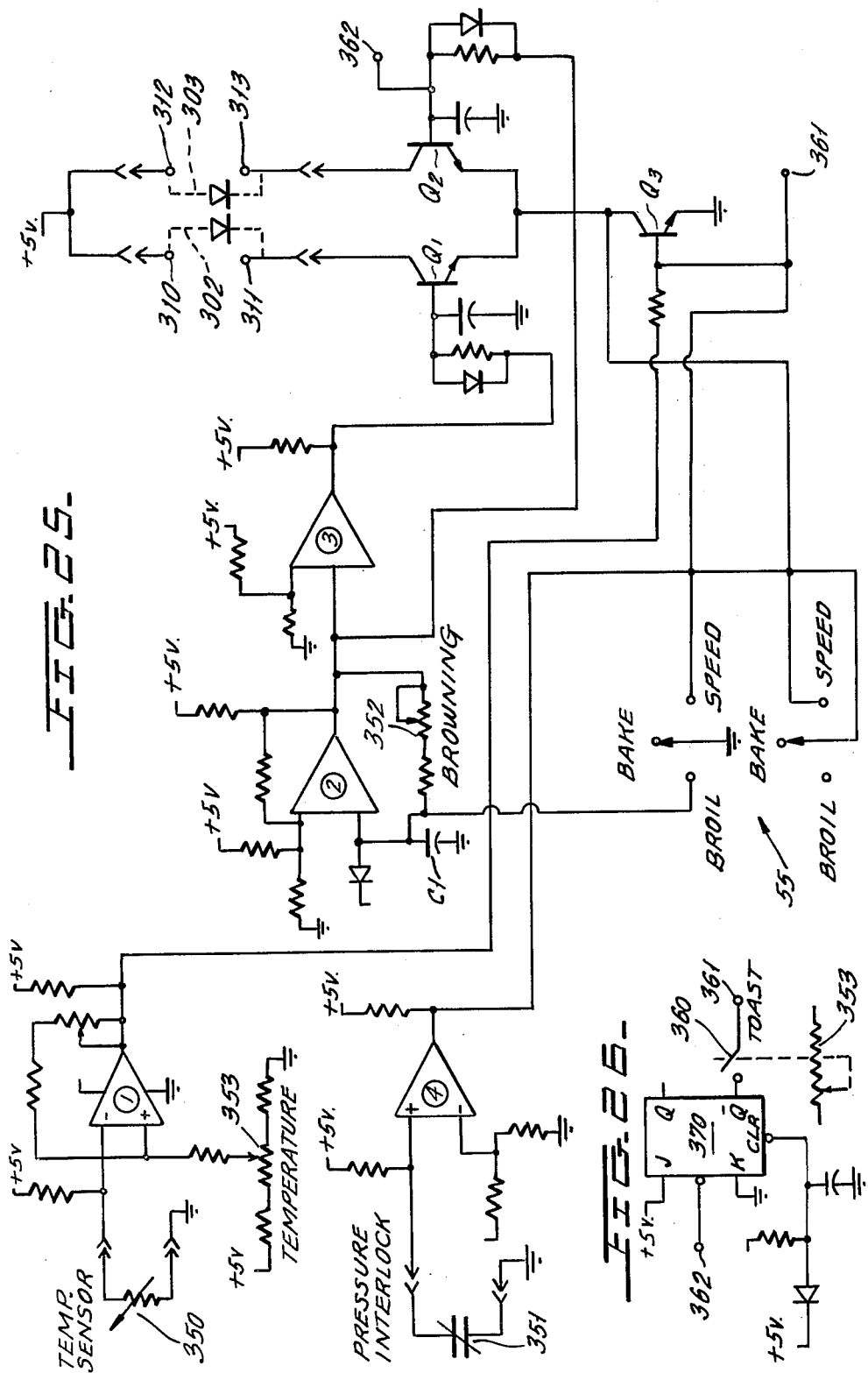

COOKING APPARATUS HAVING INTERNAL PRESSURIZING SOURCE AND INTEGRAL HEAT SOURCE

BACKGROUND OF THE INVENTION

This invention relates to cooking ovens, and more specifically relates to a novel pressure cooking oven which has internal heating sources which can brown foodstuff during pressure cooking.

It is known that if the cooking time required for an oven to cook foodstuff can be reduced, the energy required to perform a particular cooking task will be reduced. Microwave ovens reduce cooking time substantially as compared to that required for a conventional thermal oven, but microwave ovens can produce taste shifts of the foodstuff which is cooked. Pressure cooking also reduces cooking time without taste shifts but, in the conventional pressure cooker, one cannot obtain browning and crisping of the foodstuff. If the foodstuff is pre-browned before cooking in a pressure cooker, the result is a "mushy" surface at best.

Conventional pressure cookers consist simply of a pressurized vessel. An external heat source is used to heat the vessel thereby boiling water internally to produce pressurizing steam and also to produce the cooking energy. Commonly, the pressure cooker will be placed on a conventional kitchen range (if it will fit on the range) and the range heating element serves as the heat source. If the pressure vessel is large, it cannot be used with some standard ranges. For example, a standard twenty-two quart pressure cooker cannot be accommodated by the standard hi-lo range made by General Electric. The need for an externally applied source of heat to the conventional pressure cooker also necessarily wastes energy due to the heating of non-essential masses which surround the pressure cooking vessel.

BRIEF DESCRIPTION OF THE PRESENT INVENTION

In accordance with the present invention, a novel, completely self-standing appliance is provided which comprises a pressurizable vessel having an integral heat source with an external control system for suitably controlling the integral heat source and for selectively causing the heat source to act as an infrared radiation energy source. The combination of the integral infrared source and pressure cooking apparatus will cause browning of the foodstuff while it is being cooked in a pressurized atmosphere to produce cooked foodstuff which is equal to or better in quality to that produced in a conventional thermal oven.

The heat source employable with the present invention can include an upper heater rod, which can also serve the function of a conventional broiling heater, and a lower heater rod, which can also serve the function of a conventional bake heater. The heat rods which are preferably employed are resistance heating elements designated "Calrod" which is a registered trademark of the General Electric Company. These heater rods are heated by conduction of electrical current therethrough. When heated to a high temperature by passage of sufficiently high current for a long enough time, they glow to a red color and become efficient infrared radiators. When heated by lower currents or for shorter times, they remain black and act as a source of convection heating and are poor sources of infrared radiation.

A water-filled pan is disposed above the upper heating rod and its water is boiled by energy from the upper rod. The boiling water serves as a source of steam when a steam-mode of operation is to be used. The steam-mode of operation can be used with or without pressurizing the vessel. Significantly, during pressurization, cooking can proceed with simultaneous browning of the foodstuff due to infrared radiation produced by the upper and/or lower heating rods.

A door of novel structure is provided in the pressurized container to permit access to the container interior. This door can be latched closed against a pressure seal which seals the interior of the container when the container is used for cooking in a pressurized mode. The door can also be held open by a controlled amount to permit circulation of air into the cooking space when operating the oven in a non-pressurized cooking mode in which air circulation through the cooking space is desired. A window is provided in the door to allow observation of the foodstuff within the oven when the door is closed. The interior of the oven is provided with conventional wire shelf supports for the foodstuff.

The novel oven can be operated in most conventional cooking modes, as well as in the novel pressure cooking mode, dependent upon whether the enclosure door is held open or latched closed; variable browning can be achieved in either mode by suitable control of the heat rods.

The pressurized container is constructed in a novel manner in that it employs a unitary cast housing which has external reinforcing ribs extending around the five walls of the enclosed housing, with all ribs extending in the same direction. The sixth surface of the generally rectangular housing consists of the door. Since all reinforcing ribs extend in the same direction, the housing can be cast without interference by the ribs when the casting jaws are withdrawn. The housing can be cast aluminum, although the housing can be stamped of other metals or constructed of steel with the various components welded together. Preferably, the interior of the housing is reflective to infrared radiation.

The electric power control system for the novel appliance is mounted away from the hot interior of the appliance and can employ any desired kind of microprocessor with centralized power control.

The cooking modes which are available with the novel self-standing oven of the invention are:
 (1) conventional bake;
 (2) conventional broil;
 (3) pressure cooking with variable browning or crisping;
 (4) steam cooking;
 (5) sealed cooking and/or warming;
 (6) toasting.

It will be noted that ovens are presently available which provide cooking in all of the modes above except for pressure cooking with variable browning and/or crisping. However, no single oven is known which provides the function of pressure cooking with browning either by itself or in combination with any or all of the other conventional cooking modes.

The bake, broil and toasting modes may be carried out with the enclosure door open to allow controlled flow of air from the outside in the cooking cavity. In conventional ovens, means is provided to produce a flow of convection air current through the oven cavity during baking and broiling to remove moisture from the cavity. Insufficient air flow would, for example, produce cookies and cakes which are overly moist. With the present invention, controlled convection is achieved by providing a door latching mechanism which allows the door to be open a precise amount when operating in either bake, broil or toasting modes. Note that other conventional air flow mechanisms could be used with the novel oven of the invention.

Sealed cooking and warming is obtained by operating the oven with the door fully closed and sealed but with the pressure control in a pressure-release position. Thus, the only route for escape of moisture from the cooking volume is through a very small opening in the pressure control mechanism associated with the cavity. When operating in the sealed cooking and warming mode, the control system is operated in the bake mode with the temperature of the oven cavity rather than its pressure being controlled. Pressure within the cooking volume is at ambient pressure. This mode is ideal for cooking foods which tend to dry out and for keeping foods warm over a long period of time without causing drying which would occur when warming with a conventional range because of the large air flow through the oven.

The steam cooking mode is carried out as previously described with the door sealed closed, using an internal source of steam, such as a shallow water-filled pan positioned above the upper heater in the cooking cavity. When operating in the pressure cooking mode, the pressure control is set to maintain a given positive pressure within the cavity. Electric power is then cycled between the upper and lower heat rods in such a way that the amount of infrared or browning energy applied to the foodstuff is appropriate for the degree of browning desired. Steam is generated both by heating the food and by boiling the water in the shallow water-containing pan. When the set pressure is reached within the cavity, the pressure control may operate to turn off the energy applied to the heating rods or, if pressure increases still further, to permit pressure release through a small pressure relief opening.

It is, therefore, an object of this invention to provide a conventional pressure cooking function with integral browning and crisping capability for an oven which may be a free-standing appliance.

Another object of this invention is to provide a novel conventional thermal oven having plural cooking modes including a pressure cooking mode with simultaneous browning and crisping.

Still another object of this invention is to reduce the energy needed for cooking foodstuff.

Yet another object of this invention is to reduce the time required for cooking in various cooking modes.

Yet another object of this invention is to provide a novel cooking mode in which heating of foodstuff occurs within a closed, pressurized vessel while infrared heat sources cause browning and crisping of the external surface of the foodstuff.

These and other objects of the present invention will become apparent upon consideration of the detailed description of the invention, when read in conjunction with the drawings.

BRIEF DESCRIPTION OF THE DRAWINGS

FIG. 1 is an exploded perspective view of the novel oven assembly of the invention.

FIG. 2 is an elevation view of the side of the oven of FIG. 2.

FIG. 3 is a cross-sectional view of the oven of FIG. 1 taken across the section line 3—3 in FIG. 2.

FIG. 4 is a plan view of one of the heating rods of the oven shown in FIG. 3.

FIG. 5 is an elevation view of the front of the oven container casting.

FIG. 6 is an elevation view of the side of FIG. 5.

FIG. 7 is a plan view of FIG. 6.

FIG. 8 is a cross-sectional view of FIG. 7 taken across the section line 8—8 in FIG. 7.

FIG. 9 is a cross-sectional view of a portion of the casting of FIG. 5 taken across the section line 9—9 in FIG. 5.

FIG. 10 is an elevation view of the front of the door of the container of the preceding figures.

FIG. 11 is a side elevation view of the door of FIG. 10 when seen from the line 11—11 in FIG. 10.

FIG. 12 is an enlarged cross-sectional view of the hinge portion of the casting of FIGS. 10 and 11 when taken across the section line 12—12 in FIG. 11.

FIG. 13 is an enlarged view of the door window region of the door of FIG. 10 when taken across the section line 13—13 in FIG. 10, and further illustrates the provision of a sealing gasket and transparent glass cover for the central window region.

FIG. 14 is a cross-sectional view of a portion of the door and the facing portion of the oven interior and particularly illustrates the pressure seal assembly for the door and the hinge structure for the door.

FIG. 15 shows the seal structure with steam pressure within the container.

FIG. 16 shows the seal structure with the seal in a blowout condition due to excess pressure within the sealed container.

FIG. 17 is an elevation view of the free end of the door assembly and shows latching projections and a handle connected to the door end.

FIG. 18 is a plan view of FIG. 17 as seen from the line 18—18 in FIG. 17.

FIG. 19 is a cross-sectional view of the assembled oven as seen from a section line corresponding to section line 19—19 in FIG. 7, and particularly illustrates the door latch mechanism with the latches engaged and the door sealed to the container.

FIG. 20 shows the door latch mechanism of FIG. 19 with the latches open and door open.

FIG. 21 is a cross-sectional view of the pressure control structure housing attached to the container.

FIG. 22 is a perspective view of the pressure control switch which is added to the housing of FIG. 21 to provide an input to the control circuitry of the condition of the pressure relief structure.

FIG. 23 is a perspective view of the pressure release mechanism which is used to modify the operation of the pressure control system of FIGS. 21 and 22.

FIG. 24 is a circuit diagram of the power switching circuit which applies power to the upper and lower heating rods.

FIG. 25 is a diagram of the control circuit for applying control signals to the circuit of FIG. 24.

FIG. 26 is a circuit diagram of the control circuitry used for the toast mode of operation which can be added to the circuit of FIG. 25.

DETAILED DESCRIPTION OF THE INVENTION

The drawings illustrate a preferred embodiment of the invention as a free-standing oven having a plurality of control modes including the novel mode employing pressure cooking with simultaneous browning. It is not necessary to employ the other cooking modes. The structure shown is the interior structure and it will be understood that the structure will be enclosed within an outer decorative housing and will be provided with a suitable bottom support for supporting the self-standing oven either from the floor or from a cabinet top and the like.

The overall oven assembly is shown in FIGS. 1 and 2. The oven has a generally rectangular form having a face which preferably has a height of about 14 inches, a width of about 22 inches and a depth of about 14 inches. The opening of the oven may have a width of about 14 inches with the remaining 8 inches of width being devoted to space for a control circuitry housing.

Note that the use of the rectangularly shaped interior for the container provides the maximum amount of space for food to be cooked and further allows for multiple shelf positions within the container. The rectangular shape also allows reflections of radiated heat waves onto food after minimum incidence on the surface of the cavity.

The oven comprises a main container body 30 which has five walls, each of which is perpendicular to an adjacent wall, and which are joined to one another to form a generally rectangular enclosure having an open end which will be sealed by a door. Preferably, the walls are relatively thin and, for example, can have a thickness of about 0.125 inch when the walls are made of cast aluminum. Preferably, the region where the walls join one another will be smoothly rounded to improve the pressure withstand capability of the cavity.

The cavity should be able to withstand at least five times the pressure encountered during pressurized cooking but still should use a minimum of material. To minimize the necessary thickness of the container wall, the container has linear reinforcing ribs such as ribs 31, 32 and 33 which encircle four walls of the container and rear ribs 34, 35 and 35 which extend across the back and fifth wall of the container. The pressure which can be withstood by the overall container is proportional to the square of the height of the reinforcing ribs. Ribs 31 to 36 may be formed integrally with the container or can be added to the exterior of the container after the container is formed. Reinforcement is also provided by the front flange 37 which surrounds the open end of the container. Note that the ribs 31 to 36 can gradually taper from a relatively small height at the corners of the container to a relatively greater height at the center of each wall. For example, they may taper from a height of about $\frac{1}{2}$ inch at the corners of walls to about 1 inch at the center of each wall.

In a preferred embodiment, the entire assembly including ribs 31 to 36 can be cast from aluminum as a unitary body. Casting is possible because the ribs 31 to 36 are parallel to one another. Thus conventional casting jaws can be withdrawn in a direction parallel to the direction of extension of the ribs. Other fabrication materials and processes could be used.

During the casting or fabrication process, all necessary openings in the body of the container can also be formed. The necessary openings include openings 40, 41, 42 and 43, best shown in FIG. 6, which receive upper and lower heating rods, as shown in FIGS. 3 and 4. Thus, an upper heating rod 44 may have its ends received through and insulated from respective openings 40 and 41 in FIG. 6, with the heating rod ends being externally accessible for electrical connection. Heating rod 44 may have the shape shown in FIG. 4 and preferably is a resistance heating element designated "Calrod" which is a registered trademark of the General Electric Company. A lower heating rod 45 of structure identical to that of rod 44 may be received by the openings 42 and 43 of FIG. 6. All openings 40 to 43 are sealed to prevent loss of pressure through the openings.

Other openings are also formed in the container including opening 47 (FIG. 6) which is a pressure access hole and an opening such as opening 48, shown in FIG. 21, which communicates with the pressure control system to be later described.

Still other openings may be provided for connection to pressure gauges, safety pop-off type valves, oven or food temperature monitors to be connected to the electrical control system, and the like.

The front surface of the casting includes the front surface flange 37 which has an extension region 50 (FIGS. 1, 5 and 7) which extends beyond a sidewall of container 30. Extension 50 has an opening 51 (FIGS. 1 and 5) which receives a housing 52 for control circuitry which is contained exteriorly of the oven cavity. Control circuit housing 52 has an upper control dial 53 which may be an oven temperature control, a central dial 54 which may control browning temperature, and a bottom control dial 55 which will enable the user to switch among broil, bake and speed modes of cooking. The speed mode is the novel mode of pressure cooking plus browning. The operation of dials 53, 54 and 55 will be explained hereinbelow.

Flange section 37 is provided with openings 60 and 61 (FIGS. 1, 5 and 14) which receive door hinge elements. The front surface adjacent opening 51 contains openings 62 and 63 (FIGS. 1 and 5) which cooperate with the door latch structure for sealing the container as will be described hereinbelow.

Flange 37 is provided with an integral lip 70 (FIGS. 1, 5 to 7, 9 and 14 to 16) which is used as a support for a sealing ring which is a part of the pressure seal between the door 80 and the container 30, as will be later described.

The door 80, shown in FIGS. 1, 2 and 10 through 20, may consist of a single aluminum casting, shown in FIGS. 10 through 13, and will have a width and height sufficient to cover the opening in the container body 30. Door 80 has a thickness and geometry to enable it to withstand cavity pressure and can, for example, be $1\frac{1}{4}$ inches thick. The door (FIG. 10) can have a honeycomb configuration on its front surface comprising depressions such as depressions 81 distributed over the door front surface, which leave a continuous web over the rear surface of the door having a thickness of about $\frac{1}{8}$ inch and a network of frontwardly facing, reinforcing webs having a thickness of about $\frac{1}{8}$ inch.

The central region of the door is provided with a window 82 consisting of a thin web having a thickness of about $\frac{1}{8}$ inch which is perforated by a plurality of rows and columns of openings which may have diameters, for example, of $\frac{1}{8}$ inch and are of sufficient size and spacing to permit an observer to look through the openings to gain a view of the interior of the container 30 while the door 80 is closed. In order to seal the door at the window 82, and as shown particularly in FIG. 13, a sealing gasket 83 having a pattern of openings which matches that of the rows and columns of openings in window 82 extends across the full width of the window 82. A tempered transparent glass plate 84 extends across the gasket 83. A pair of retaining clamps 86 of FIG. 13 retain the glass 84 and gasket 83 in position.

It will be noted that shattered glass of plate 84 would not scatter exteriorly of the oven cavity in the unlikely event of an over-pressurization accident. This is because the small holes in section 82 of the door prevent glass fragments from exploding into the room containing the oven. Glass plate 84 also acts as a heat insulator for the interior surface of door 80 so that heat removal from the oven by door 80 is substantially reduced.

The front surface of door 81 can be covered as shown in FIG. 1 by a decorative glass panel 85 which is suitably secured by brackets (not shown) over the full surface of the door 80. Panel 85 is provided with a blackened or opaque region surrounding a rectangular transparent region 86 which is in alignment with the window 82, thus masking the honeycombed aluminum front of the door 80.

The door casting of FIG. 10 is cast with slots 90 and 91 on its hinge end and slots 92 and 93 on its free end. Slot 90 is shown in greater detail in FIG. 12 which also shows the slot as having an opening 92 in a reinforced boss region of the door adjacent slot 90 and an opening 93 for receiving a steel pivot pin 95.

The opening 92-93 runs the length of the door and has a diameter only slightly larger than the diameter of steel pivot pin 95. This provides a force-fit such that pivot pin 95 can be driven into position from the top or bottom edge of door 80.

As shown in FIG. 14, steel pivot pin 95 pivotally receives a threaded hinge link 96 which is clamped to flange 37 of housing 30 as by the nuts 97, 98 and 99. Link 96 along with an identical hinge link 100, shown in FIG. 1, are then pivotally supported at the hinge edge of the door 80 and are fixed to the flange 37 so that the door can swing open and closed on pivot pin 95 and another identical pin contained within the opening 91 of the door.

A novel pressure seal structure is provided to seal the door 80 against the periphery of flange 37 in order to seal the container 30. The pressure seal structure is shown in FIGS. 1, 14, 15 and 16 and includes an O-ring 110 which is secured on and surrounds the flange 70 of the container 30. The diameter of the O-ring 110 is greater than the length of flange 70 so that the O-ring 110 will be compressed when the door is closed. The O-ring 110 is covered by a relatively thin flexible sheet of silicone rubber 111 which is clamped against the flange 37 by a clamping ring 112 which is attached suitably to flange 37. Sheet 111 extends over O-ring 110 and a predetermined distance (about 1 inch) over flange 70 and cooperates with the O-ring 110 to form a sealed opening around the periphery of the cubicle 30.

Thus, FIG. 14 shows the door 80 sealed against container 30 with relatively low pressure within container 30. O-ring 110 and sheet 111 are compressed between the opposing surfaces of flange 37 and door 80. The initial pressure seal is created between the surface of door 80 and the line on sheet 111 which is pressed against door 80 by seal ring 110.

As pressure within container 30 increases and as shown in FIG. 15, door 80 moves slightly away from flange 37, and seal ring 110 is no longer compressed. However, the flat rubber sheet 111 will expand in the manner of a balloon and be forced against the door 80 in a positive manner and acts as the main seal in the pressure mode of operation. Note that if the pressure becomes excessive within the container 30, the seal 111 will blow out as shown in FIG. 16, thus relieving the interior pressure.

The door is also provided with an extension 80a of metal which extends inside the oven cavity when the door is closed (see FIGS. 14-16). Extension 80a serves to shield the silicone rubber seal from direct incidence of IR radiation. Extension 80a has typical dimensions of 0.125 inch thickness, with about a one inch extension beyond the main web. The extension forms a ring around the door, such that, when the door is closed, the extension is approximately ½ inch from the inside edge of the oven cavity.

In the arrangement shown in FIGS. 14, 15 and 16, the seal ring 110 and sheet 111 are mounted on the flange 37 of the container. If desired, the seal ring 110 and sheet 111 could be mounted on the door. The sheet 111 will then be less subject to damage due to contact with pots and pans and the like upon their entry into the oven cavity.

Also the seal ring 110 and sheet 111 can be provided as a single piece of silicone rubber using conventional rubber gasket casting methods.

The novel seal structure achieves three basic functions:

(1) It provides the initial seal without requiring excessive force in closing the door as shown in FIG. 14.

(2) It allows motion of the door 80 away from the container 30 when pressurization within container 30 occurs while still maintaining a seal.

(3) The novel seal acts as a pressure relief mechanism for relieving pressure without permanently damaging the seal as shown in FIG. 16 in response to some over-pressurization within the container 30.

The door latch assembly for latching the door in its closed and sealed position is shown in FIGS. 17 through 20. Referring to FIGS. 17 and 18, the free end of the door has extending latch pins 120 and 121 which are appropriately fixed in the slots 92 and 93 of the door 80. Note that a handle 122 is also fixed to the free end of the door as shown in FIGS. 17 and 18. Latch pins 120 and 121 have a U-shaped opening, shown as the U-shaped opening 125 for latch pin 120 in FIG. 18. These U-shaped openings operate to receive latching pawls having cam-shaped ends for forcing the free end of the door into a closed and sealed position. The latching pawls are best shown in FIGS. 19 and 20.

The latching pawls of FIGS. 19 and 20 are slidably mounted for longitudinal motion along a common axis by suitable guides 153 and 154, respectively, which are fixed to the outside surface of the side of container 30. The pawls are operated by an operating handle 150 which extends through the left-hand side of opening 51 (FIG. 5) of the extension 50. The opposite ends of pawls 151 and 152 have cam surfaces 155 and 156, respectively, and are arranged such that they will enter and engage the interior surfaces of latch pins 121 and 120, respectively, when they move to the latching position shown in FIG. 19.

The operating lever 150 is pivotally mounted by pivot pin 160 to a mounting block 161 which is secured to the side of container 30. A first connecting link 162 is pivotally connected between the upper end of latch pawl 151 and a point on lever 150 by the pins 163 and 164, respectively. In a similar manner, the lower end of pawl 152 is connected to operating rod 150 by the link 170 through the pins 171 and 172. As a result, when operating handle 150 rotates, the pawls will slide either toward one another or away from one another.

In the position shown in FIG. 19, the latch pawls engage the latch pins and hold the door 80 securely closed. In order to open the door, lever 150 is rotated upwardly to the position shown in FIG. 20. This motion will cause the retraction of latch pawls 151 and 152 out of their respective latch pins 121 and 120 so that the door 80 can be opened as shown in FIG. 20.

When the door 80 is to be held in a controlled open position so that air can circulate into the cavity of the oven during cooking, the door 80 is opened as shown in FIG. 20 and the lever 150 is returned to the latching position shown in FIG. 19 so that the latching pawls 151 and 152 move to the position shown in FIG. 19. The door 80 is then closed until the ends of the latch pins 120 and 121 engage the left-hand surfaces in FIG. 19 of the pawls 152 and 151, respectively. The door will remain in the open position set by the length of pawls 151 and 152 due to friction on the hinge links 96 and 100 of the door 80. Thus, the door will remain in a very accurately controlled open position dependent upon the length of the latch pins 120 and 121, so that baking, broiling and toasting can be carried out with a desired amount of air flow into the oven cavity.

It will be observed that the latch structure of FIGS. 19 and 20 provides three basic functions:

(1) It provides mechanical advantage for tightly closing the door against the pressure seal by the cam surfaces 155 and 156 on the latch pins which will enter and then cam the latch pins 120 and 121 toward a tighter sealed position, thereby to strongly compress the seal of the oven when closing the oven door.

(2) It prevents inadvertent opening of the door when the oven cavity is pressurized because, once the door is closed and the interior of the oven becomes pressurized, friction between the latch pawls 151 and 152 and their respective latch pins 121 and 120 becomes so high that it cannot be easily overcome by physical movement of the handle 150. Note that, if desired, a shear pin (not shown) can be provided in the operating handle mechanism which would shear if excessive force is applied to the handle 150 while the oven door is closed. Note also that the friction force can be aided by providing an indentation, such as notches 151a and 152a of FIG. 19, in the latch pawl which indentation coincides with the width of the latch pins when lever 150 is in the closed and latched position, as shown in FIG. 19.

(3) It allows the door to be held open by a precise amount during conventional baking, broiling and toasting modes of operation.

In order to produce steam and thus pressure in the interior of the oven and as shown in FIG. 3, the oven may have two brackets 250 and 251 extending from its top which can slidably receive a shallow pan 252 which can be filled with water to a volume, for example, of 100 to 200 milliliters. The water-containing pan 252 is placed very close to the upper heating rod 44 so that the water is quickly heated when steam generation is desired. Note that the control algorithm which will be later described can provide that the upper heating element 44 will be turned on initially for a longer period of time than the set cycle rate would call for in order to cause boiling and thus steam generation to start more quickly. Note also that the provision of the water pan 252 above the upper heating rod is a novel employment of a steam source for a pressure cooker in that many large prior art steam cookers use an externally generated steam which is produced in a device frequently mounted on the side of the oven. Clearly, the pan 252 can be easily removed for non-steam cooking modes of operation.

Considering next the pressure control mechanism, this mechanism is best shown in FIGS. 21, 22 and 23. The pressure control system is contained in a rectangular solid aluminum block 180 which is fixed against the side of container 30 as shown, for example, in FIGS. 6 and 7. The pressure control body has a first opening 181 therein as shown in FIG. 21 which communicates with pressure inlet hole 48 in container 30. Opening 181 communicates with a first vertical opening 182 which is joined to a second vertical opening 183 over a tapered valve seat region 184. By way of example, the opening 182 may have a diameter 0.313 inches and a length of 0.75 inches. The opening 183 may have a diameter of 0.316 inches and a length of 3 inches. The opening 183 receives a steel rod 185 of diameter 0.313 inches which is topped by a weight 186 which may be 200 grams.

The bottom of the steel rod 185, which is slightly smaller in diameter than opening 183, is provided with a chamfer 187 which, as will be later described, provides a hysteresis effect for the valve operation. The valve is closed when the bottom edge of chamfer 187 engages a line around the surface of tapered valve seat 184. The diameter of chamfer 187 at its bottom is 0.300 inches.

A pressure relief opening 190 (of diameter 0.067 inch) is formed through the block 180 and into the second opening 183. An angle-shaped stop 191, which acts as a travel stop for the rod 185 and weight 186, is secured to container 30 as shown.

The structure described above for FIG. 21 will now serve as the main pressure regulation structure during the pressure cooking mode of operation. So long as the end of the rod 185 is below the pressure relief opening 190, the container 30 is sealed. However, once the bottom of rod 185 moves above the pressure relief opening 190, pressure is released from container 30 at a relatively rapid rate.

Pressure within container 30 will be controlled at a set pressure determined by the weight of rod 185 and of weight 186. So long as the product of the pressure within container 30 and the area of the bottom of chamfer 187 (which is sealed on seat 184) is less than the total weight of members 185 and 186, the valve remains closed. However, once this product exceeds the total weight of members 185 and 186, they move upwardly against the force of gravity or any other desired bias until pressure relief opening 190 is exposed.

The valve control has a controlled amount of hysteresis because of the chamfer 187 on the bottom of rod 185. Thus, when chamfer surface 187 is seated in the valve seat 184, the cross-section presented to the interior pressure of chamber 30 is controlled by the inner diameter of the chamfer. Once the valve opens, however, the internal pressure of container 30 is applied over a surface extending to the outer diameter of the chamfer and thus of rod 185. Therefore, as soon as the rod 185 lifts off the valve seat, the cross-section presented to the pressure within container 30 increases substantially and the entire rod 185 and weight 186 will be forced against the stop 191. Pressure can then bleed through the hole 190 until it is reduced below the set pressure value by an amount determined by the ratio of the inner and outer diameters of chamfer 187. The amount of hysteresis can be adjusted by adjusting the chamfer. Some degree of hysteresis is desirable to permit positive seating of the valve between pressure control cycles. Positive seating of the valve will also allow steam pressure to build more easily.

The position of the weight 186 and rod 185 may be monitored electrically by employing a spring steel wire 200 which normally engages the bottom of the weight 186 and maintains engagement with the bottom of weight 186 until it rises to a level at which the bottom of the rod 185 moves off of the valve seat 186. Note that spring seal wire 200 can be held in any desired manner and can be held on a bracket 201 which is fixed to the block 180. Electrical terminals extending from the block 180 and from the spring steel wire 200 are shown as terminals 202 and 203, respectively, in FIG. 22 and are taken to a suitable electronic control circuit.

The control arrangement of FIGS. 21 and 22 can incorporate the overriding pressure release mechanism shown in FIG. 23. This override can be used during steam cooking or sealed cooking modes which do not require over-pressure within the container, and can be used to manually release pressure at the end of a pressure cooking cycle. As shown in FIG. 23, an actuator mechanism operated by a control knob 210 is added which rotates a shaft 211 having a crank arm 212 at its end. The position of shaft 210 is maintained against unintended rotation by a suitable friction bushing 213. The crank arm 212 is connected by a connecting wire 214 to one end of a pivoted tab 215 which is pivoted at a fixed pivot point 216 mounted on a tab 217 extending from block 180. The left-hand end of the lever or tab 215 is disposed beneath the weight 186. A point just to the right of the pivot 216 is connected to the travel stop 191 by a return biasing spring schematically illustrated as the spring 220.

In a normal adjustment position, the spring 220 will maintain the lever 215 rotated in a counterclockwise direction so that it does not interfere with the movement of the weight 186 and its dependent rod 185. However, by rotating knob 210 counterclockwise, one can overcome the force of the return spring 220 and cause the lever 215 to rotate clockwise and thus raise the weight 186 and rod 185 to a point above the level of the pressure relief hole 190 in FIG. 21, thereby to release the pressure within the cavity shell 30.

Note that by turning the knob 210 carefully one can provide a vernier exposure of the pressure relief hole 190 and, therefore, can control the rate at which depressurization occurs following pessurized cooking. A slow depressurization rate is desirable because depressurization may cause water inside the cavity 30 to boil because pressure equilibrium has been reduced. If too rapid a depressurization occurs, frothing and boil-over may occur within the oven.

The novel control structure which has been described in FIGS. 21, 22 and 23 produces very good pressure control which is dependent only on the weight of the assembly of the rod 185 and weight 186. Moreover, pressure control will not change with age or use. Finally, because hot steam is constantly passing through all of the channels of the pressure control and because block 180 is immediately adjacent the container shell 30, the channels will remain as hot as the hot steam which passes through the control. This then allows for continuous purging of the channel and, because the pressurized steam is at a higher temperature than the ambient boiling point of water, the outside control system will remain essentially dry.

There is next described the electronic control system for controlling the energization of the heating rods 44 and 45 according to the various modes of operation of the novel oven. The mode of operation of the electronic circuitry which is shown in FIGS. 24, 25 and 26 is controlled by the controls 53, 54 and 55 in the control container 52 of FIG. 1.

Control 55, shown in FIG. 25, is a switch for selecting between broil, bake and speed modes of operation. The speed mode position calls for pressurized cooking with variable browning.

Control knob 54 controls circuits which control the degree of browning. This is controlled by controlling the length of time that each of the heating rods 44 and 45 in the system are energized before switching to the other heating rod. The longer a given heating rod is energized, the longer it remains at its maximum temperature and the longer it will give off the high frequency infrared radiation required for browning. If, however, the heating rods are cycled quickly, they will never attain their maximum temperature and, although the same amount of energy is input to the oven cavity, the heat is provided as "black heat" which will cause warming but will not produce a substantial level of infrared radiation. Note that the degree of browning will not be controlled in the broil mode because in the broil mode the top heater is held constantly on, until a set temperature is reached.

The power switching circuit of FIG. 24 controls the energy applied to the upper and lower heating rods 44 and 45 by controlling the conduction time of triacs 300 and 301, respectively which are connected in series with rods 44 and 45, respectively. The pairs of series-connected heating rods and triacs are connected between the a-c line L1 and neutral N. Triacs 300 and 301 may be Type SC150. They are controlled by the control of optically isolated phototransistor couplers 302 and 303, respectively. The outputs of photo-isolated control circuits 302 and 303 are connected through suitable amplifier circuits 304 and 305, respectively, through full-wave, bridge-connected rectifiers 306 and 307 to the gate circuit of the triacs 300 and 301, respectively. Each of circuits 304 and 305 is identical and can employ several transistor stages including an input transistor which may be a 2N2222 followed by two further transistors, each of Type D44T8. Suitable biasing and current limiting resistors are employed in the usual manner. The photo-isolated input members 302 and 303 are energized from terminals 310-311 and terminals 312-313, respectively, which are, in turn, controlled by the control circuit of FIG. 25.

It should be noted that other power switching circuits could be used in place of the circuit of FIG. 24. For example, well-known pulse transformer switching of the triacs could be used or electromechanical relays could be used, if desired.

FIG. 25 shows a control circuit which could be used to provide inputs to the couplers 302 and 303 of FIG. 24. The circuit of FIG. 25 employs a quad-comparator, Type LM339, with sections 1, 2, 3 and 4 of the quad-comparator arranged as shown. Comparator 1 controls the energy applied to the heating rods 44 and 45 when the function switch 55 is in the bake or broil mode. Control of the heating rods 44 and 45 in the bake or broil mode is under the control of a conventional temperature sensor 350 which is suitably placed inside the oven cavity. Comparator 2 is used during operation in the browning mode and provides the variable duty cycle needed to control the browning mode. Comparator 3 is employed essentially as an inverter circuit. Comparator 4 operates as a threshold comparator to determine whether the pressure control switch employing spring steel wire 200 is open or closed. The switch controlled by the spring steel wire 200 is shown in FIG. 25 as switch 351.

The mode control 55 of FIG. 1 is shown in FIG. 25 as the switch assembly 55. The browning control 54 of FIG. 1 corresponds to the potentiometer 352 in FIG. 25. Finally, the temperature control 53 of FIG. 1 corresponds to the potentiometer 353 of FIG. 25.

In the circuit of FIG. 25 and in order to turn on the upper heating rod 44, it is necessary to turn on transistor Q1. In order to turn on the lower heating rod 45, it is necessary to turn on transistor Q2. These transistors will apply suitable input signals to the optical couplers 302 and 303, respectively.

It will be noted that the circuit of FIG. 25 is powered by a suitable 5-volt power supply, the detail of which is not shown.

As pointed out above, the comparator 2 is used to provide the variable duty cycle needed for browning control. Comparator 2 is a conventional comparator square wave oscillator. The browning control potentiometer 352 controls the duty cycle in a square wave pattern from 15 seconds for each of heater elements 44 and 45 up to 2 minutes on for each element. The time constant is controlled by the capacitance of capacitor C1 and the resistance of the circuit including potentiometer 352. The circuit of comparator 2 also contains a diode D1 which provides a short-circuit path from the capacitor C1 to ground when the power supply is turned off. This causes capacitor C1 to start at a low voltage for the first cycle after power is turned on. As a result, heating rod 44 will always come on for the initial cycle for a longer period of time.

As pointed out previously, it is desirable that the top heating rod 44 should come on for a longer period of time during the initial cycle to allow a greater amount of steam generation from the steam pan 252 which is placed above the upper rod 44. This would also cause further heating of the surface of the food to be cooked in the first cycle. Furthermore, during the toasting mode, the upper heating rod 44 will be on for a longer period of time, thus more uniformly browning the toast which is disposed beneath the upper heating rod as the upper heating rod tends to heat the overall cavity from a cold start.

Comparator 3 is used essentially as an inverter circuit which provides the opposite signals to transistor Q2 than is provided for transistor Q1. The circuit including diode D2, resistor R2 and capacitor C2 is used to slightly delay the turn on of transistor Q1. An identical circuit is employed to slightly delay the turn on of transistor Q2. This prevents the possibility of transistors Q1 and Q2 being on during the instant when the oscillator switch changes state. It is necessary that this delay be longer than 8 milliseconds since the triacs 300 and 301 only turn off at the zero crossing of the 60 hertz a-c line to which they are connected. The cycling signal for browning is applied to transistor Q2 and then Q1 at a rate which is determined by the browning setting of the potentiometer 352.

If the function switch 55 is set in either bake or broil, control of the heating rods 44 and 45 is provided by comparator 1 in connection with the temperature sensor 350. The threshold point of comparator 1 is set by the potentiometer 353 and a comparison is made between the set point voltage and the incoming voltage developed across the temperature sensor. As the temperature sensor heats up, the voltage across it increases due to the current supplied by the resistor R3. When the temperature exceeds the set point voltage, the comparator goes low, turning off transistor Q3, which then turns off whichever of transistors Q1 or Q2 has been turned on. The collectors of transistors Q1 and Q2 then appropriately control heater rods 44 or 45, respectively.

Note that in the broiling mode, connection is made to the negative input of comparator 2 which forces comparator 2 to stop cycling and to continuously enable the circuit which controls the upper heating rod 44. Temperature control will still control the energization of the upper heating rod 44 in the broil mode.

When the function control 55 is set to the speed position (pressure cooking plus browning), the temperature control 350 is disabled by grounding the base of transistor Q3. Transistors Q1 and Q2 are now energized by the open collector output of comparator 4. Comparator 4, as pointed out previously, is a threshold comparator to determine whether the pressure control switch 351 is opened or closed. If the switch is closed, transistors Q1 and Q2 will be energized and, therefore, either of the upper or lower heating rods 44 or 45, respectively, will be energized. When the switch 351 is open, indicating that the pressure control is lifted off the valve seat by pressure in excess of the set point, transistors Q1 and Q2 will be deenergized so that neither of the heating rods 44 or 45 is turned on.

As pointed out previously, the control system of FIG. 25 can also be used for controlling toasting. In this case, the browning control potentiometer 352 is turned to its highest position. When power is applied, the upper heating rod 44 will remain on for a longer period of time for the first cycle. Thereafter, the lower heating rod 45 will be turned on for a shorter period of time. Both of these periods of time are controlled directly by the position of the potentiometer 352. After 1 cycle, from upper heating rod 44 to lower heating rod 45 and starting again on the upper heating rod 45, the oven will turn off. At this point the desired degree of brownness of the toast will be achieved. This algorithm is repeatable and produces reliable toast quality.

The toasting function described above can be achieved by providing an additional switch on the temperature control potentiometer 353 which switches the temperature control into the toasting mode when the temperature control is turned fully up. This switch is schematically shown in FIG. 26 as a switch 360 which is operated in response to the placement of potentiometer 353 in its maximum position. By closing switch 360, the toast mode is initiated and terminals 361 and 362 of FIG. 25 are connected to the corresponding terminals 361 and 362 in FIG. 26. Referring to FIG. 26, there is provided a simple flip/flop 370 which may be a Type 74107 having the inputs and outputs shown. This flip/flop functions to turn off the oven after a single cycle between the upper and lower heating rods 44 and 45 has occurred.

The present invention may be embodied in other specific forms without departing from the spirit or essential attributes thereof and, accordingly, reference should be made to the appended claims, rather than to the foregoing specification as indicating the scope of the invention.

What is claimed is:

1. An interior oven structure, comprising:

a hermetically-sealable metal container having a metal door which is operable to offer access to the interior of said container and closeable to seal the interior of said container;

means for supporting within said container foodstuff to be cooked;

heating means within said container and energizable to produce infrared heat for browning said foodstuff while said container is pressurized; and means totally contained within said container, and separated from but cooperating with said heating means in said container, for producing steam, to pressurize the interior of said container when said door seals the interior of said container.

2. The interior oven structure of claim 1, wherein said heating means includes a first heating element.

3. The interior oven structure of claim 2, wherein said first heating element is a broiling heating rod disposed adjacent to the top of the interior of said container.

4. The interior over structure of claim 2, further including a second heating element disposed within said container.

5. The interior oven structure of claim 4, wherein said second heating element is a baking heating rod disposed adjacent to the bottom of the interior of said container.

6. The interior oven structure of claim 4, further comprising control means for selectively energizing at least one of the first and second heating elements, in the presence or absence of positive pressure in said container and with said door either open or sealed closed.

7. The interior over structure of claim 3, wherein said steam-producing means includes a shallow water container disposed adjacent to the top of the interior of said container and between said interior top and said broiling heating rod.

8. The interior oven structure of claim 1, wherein said heating means comprises a broiling heating element disposed adjacent to the top of said container and a baking heating element disposed adjacent to the bottom of said container.

9. The interior oven structure of claim 8, further comprising control means for selectively energizing at least one of said broiling or baking heating elements, in the presence or absence of positive pressure in said container and with said door either sealed closed or open.

10. The interior oven structure of claim 1, further including means for controllably introducing external ambient air into said container during oven operation.

11. The interior oven structure of claim 1, further including latch means for holding said door in first and second positions; said first position comprising a sealed-closed position; and said second position comprising a controlled open position which permits circulation of air into said container during operation of said oven.

12. The interior oven structure of claim 11, further including pressure relief means connected to said container for venting interior pressure when said interior pressure exceeds a predetermined value with said door in said first position.

13. An interior structure for a free-standing pressure cooker oven which is capable of operation in a plurality of modes including a bake mode, a broil mode, a steam mode, a warming mode, a toasting mode and a pressure cooking mode with variable browning, said oven comprising:

a hermetically-sealable metal container having a metal door operable to offer access to the interior of said container and closeable to seal the interior of said container;

means for supporting within said container foodstuff to be cooked;

heating means within said container energizable to produce infrared heat for browning said foodstuff while said container is pressurized; said heating means including a broiling heating rod disposed adjacent to the top of the interior of said container; a baking heating rod disposed adjacent to the bottom of the interior of said container; and control means for selectably energizing at least one of said heating elements; and means within said container and separated from but cooperating with said heating means for producing steam to pressurize the interior of said container when said door seals the interior of said container; and including a water container disposed adjacent to said broiling heating rod.

14. The interior oven structure of claim 13, wherein said water container is disposed between said broiling heating rod and the top of the interior of said container.

15. The interior oven structure of claim 13, wherein said sealed container has a generally rectangular cross-section and wherein said door extends across one surface of said rectangular container; and further comprising a plurality of reinforcing ribs secured to the exterior of each of the remaining five walls of said container.

16. The interior oven structure of claim 15, wherein said plurality of ribs are straight ribs, with the reinforcing ribs on each of said walls being spaced parallel to one another and having tapering profiles perpendicular to the adjacent wall for reinforcing said walls to enable said walls to safely withstand the pressure differential across said walls due to steam pressure within said container.

17. The interior oven structure of claim 15, wherein said five walls and the reinforcing ribs thereon are of cast aluminum and are integral with one another.

18. The interior oven structure of claim 15, wherein the interior of opposing sidewalls of said container include integral support means for receiving and supporting foodstuff support trays within the interior of said container and for receiving and supporting a water-filled tray adjacent the top of said container, selected ones of said sidewalls having integral openings for receiving first and second heater rods adjacent to the top and bottom respectively of said container.

19. The interior oven structure of claim 13, further comprising a foodstuff-viewing window in an aperture provided in said door, said window including: a first solid opaque plate having an array of apertures formed therethrough; a second solid opaque plate having a substantially identical array of apertures formed therethrough, and arranged spaced from and substantially parallel to said first plate with apertures of said first and second plates in registration; a sheet of a transparent material positioned between said first and second plates; and means for clamping the sandwiched first plate, material sheet and second plate in the cavity door aperture.

20. The interior oven structure of claim 19, wherein the apertures in said first and second sheets are of a size allowing viewing into said cavity but substantially preventing pieces of said sheet material exiting from said door in the event of a shattering of said material layer.

21. The interior oven structure of claim 20, wherein said sheet material has relatively low heat conductivity.

22. The interior oven structure of claim 13, wherein said hermetically-sealable container includes sealing means comprising: a flange disposed about and forward of said cavity door opening; an O-ring positionable adjacent to the exterior surface of said flange when said door is closed and of a diameter greater than the extension of said flange forward of the front surface of the oven cavity; and a thin, flexible and resilient sheet disposed between said ring and the rear surface of said door when said door is closed.

23. The interior oven structure of claim 22, wherein said door further comprises a rearward extension shaped to enter said cavity opening flange and positioned, when said door is closed, to shield said resilient sheet from infrared radiation in said cavity.

24. The interior oven structure of claim 22, wherein said ring and sheet are a unitary element.

25. The interior oven structure of claim 22, wherein said ring and sheet are secured to said cavity.

26. The interior oven structure of claim 22, wherein said ring is adapted to allow said sheet to unseal said cavity when the pressure within said cavity exceeds a predetermined magnitude.

27. An interior structure for a cooking oven, comprising:
- a metal container having a single metal door openable and closeable to respectively offer and prevent access to the interior of said container;
- means for supporting within said container foodstuff to be cooked;
- heating means within said container energizable to produce infrared heat for cooking said foodstuff, and including a first heating rod disposed adjacent to the top of the interior of the container and a second heating rod disposed adjacent to the bottom of the interior of said container;
- control means for selectably energizing at least one of said first and second heating rods; and
- means, including a water container disposed adjacent to one of said first and second heating rods within said container, separated from but cooperating with said heating means for producing steam within the interior of said container.

28. The interior oven structure of claim 27, wherein said water container is disposed between the top of the container interior and the first heating rod.

29. The interior oven structure of claim 27, wherein the container has a generally rectangular cross-section and wherein said door extends substantially completely across one surface of said rectangular container.

30. The interior oven structure of claim 29, wherein the interior and opposing side walls of said container includes integral support means for receiving and supporting foodstuff support trays within the interior of said container and for receiving and supporting said water container adjacent to the top of said container.

31. The interior oven structure of claim 30, further comprising a foodstuff-viewing window in an aperture provided in said door, said window having a layer of transparent material sandwiched between a pair of opaque layers having a multiplicity of registered apertures therein.

* * * * *

UNITED STATES PATENT AND TRADEMARK OFFICE
CERTIFICATE OF CORRECTION

PATENT NO. : 4,430,557

DATED : February 7, 1984

INVENTOR(S) : Charles W. Eichelberger, Robert J. Wojnarowski and Thomas M. O'Loughlin It is certified that error appears in the above-identified patent and that said Letters Patent is hereby corrected as shown below:

Title page, Item [75] should read as follows:

-- Charles W. Eichelberger, Schenectady; Robert J. Wojnarowski, Ballston Lake, both of New York; and Thomas M. O'Loughlin, Milford, Connecticut --.

Signed and Sealed this

Twenty-seventh Day of November 1984

[SEAL]

Attest:

GERALD J. MOSSINGHOFF

Attesting Officer

Commissioner of Patents and Trademarks